United States Patent Office 3,769,280
Patented Oct. 30, 1973

3,769,280
PROCESS FOR ACYLATION OF
CEPHALOSPORIN ESTERS
George Parker, Prescot, England, assignor to Lilly
Industries Limited, London, England
No Drawing. Filed Sept. 24, 1971, Ser. No. 183,643
Claims priority, application Great Britain, Sept. 11, 1971,
42,454/71
Int. Cl. C07d 99/24
U.S. Cl. 260—243 C                2 Claims

ABSTRACT OF THE DISCLOSURE

Acylation of the p-nitrobenzyl ester of 7-aminocephalosporanic acid or 7-aminodesacetoxycephalosporanic acid with a mixed anhydride is improved when carried out at a temperature between below about $-15°$ C. and about $-50°$ C.

BACKGROUND OF THE INVENTION

In the production of cephalosporin antibiotics, it is customary to proceed by acylating an ester of the so-called "cephalosporin nucleus" having the formula:

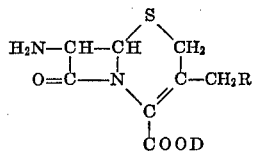

In the above formula, D denotes an ester of the cephalosporin nucleus and R represents hydrogen or an acetoxy group. When R is an acetoxy group, the above compound is an ester of 7-aminocephalosporanic acid, commonly known as 7-ACA. When R in the above formula is hydrogen, the compound is an ester of 7-aminodesacetoxycephalosporanic acid, commonly known as 7-ADCA.

It has been customary to acylate the ester of the 7-amino cephalosporin nucleus using a mixed anhydride of the selected acylating agent containing, if necessary, suitable blocking groups to protect other reactive centers. Upon completion of the acylation, the ester function as well as any appropriate blocking groups are removed to produce the active cephalosporin antibiotic.

Recently, it has been found to be advantageous in the preparation of cephalosporin antibiotics to use the p-nitrobenzyl ester of the 7-amino cephalosporin nucleus; see U.S. Pat. No. 3,632,850, issued Jan. 4, 1972. Customarily, the acylation of the p-nitrobenzyl ester of 7-ACA or 7-ADCA using a mixed anhydride has been carried out at a temperature below room temperature but not lower than about $-15°$ C. This invention is directed to an improvement resulting in increased product yields in the mixed anhydride acylation of the p-nitrobenzyl ester of 7-ACA or 7-ADCA.

SUMMARY OF THE INVENTION

It has now been discovered that improved yields of the acylated p-nitrobenzyl ester of 7-ACA or 7-ADCA are attainable by carrying out the mixed anhydride acylation at temperatures below those at which the acylation has heretofore been accomplished.

Broadly, this invention is defined as an improvement in a method for the acylation of the p-nitrobenzyl ester of 7-aminocephalosporanic acid (7-ACA) or 7-aminodesacetoxycephalosporanic acid (7-ADCA) with a mixed anhydride, the improvement being accomplished by conducting the acylation at a temperature between below about $-15°$ C. and about $-50°$ C.

Preferably, the improved process of this invention is carried out using a mixed anhydride of the formula

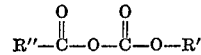

wherein R′ is a $C_1$–$C_4$ alkyl; R″ is $C_1$–$C_8$ alkyl,

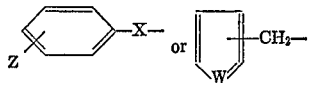

in which W is sulfur or oxygen; Z is hydrogen, loweralkyl, trifluoromethyl, loweralkoxy, —OY, nitro, —NHR‴, loweralkylamino, diloweralkylamino, chloro, bromo, or fluoro; X is $$-(CH_2)_n-, \; -OCH_2-, \; \underset{NHR'''}{-CH-} \; \text{or} \; \underset{OY}{-CH-}$$

n is 0 or 1; Y is $C_1$–$C_4$ alkyl, benzyl or $C_1$–$C_4$ alkanoyl; and R‴ is

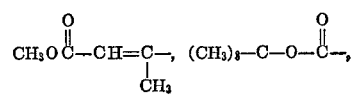

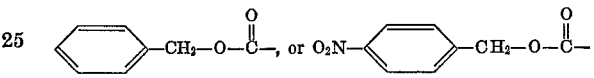

DETAILED DESCRIPTION OF THE INVENTION

This invention results in increased yields of cephalosporin antibiotics and is directed to an improved process for the acylation of the p-nitrobenzyl ester of a 7-amino cephalosporin nucleus with a mixed anhydride form of an acylating agent, the improvement comprising conducting the reaction at a temperature between below about $-15°$ C. and about $-50°$ C.

The cephalosporin nucleus which is employed in the acylation reaction may be the p-nitrobenzyl ester of either 7-amino-cephalosporanic acid (7-ACA), in which R in the preceding formula of the cephalosporin nucleus is an acetoxy group, or of 7-amino-desacetoxycephalosporanic acid (7-ADCA), in which the R substituent is hydrogen. A part of the discovery which forms the basis of this invention resides in the use of an ester of 7-ACA or 7-ADCA, and, specifically, the p-nitrobenzyl ester. It has been found that the improved results available from the low temperature acylation in accordance with this invention are especially apparent when the p-nitrobenzyl ester is employed.

In accomplishing the acylation of the free amino group at the 7-position of the cephalosporin nucleus, the acylating agent which is used is employed in the form of a mixed anhydride. The mixed anhydride is prepared according to well-known procedures, typified, for example, by the reaction of an alkyl chloroformate with a salt of the acid which corresponds to the intended 7-acyl substituent and which has suitable protecting groups for any other reactive substituents on the acid. Any alkyl chloroformate may be employed, but typically, for convenience, the alkyl chloroformate is one in which the alkyl group has from about 1 to about 4 carbon atoms, such as, for example, methyl chloroformate, ethyl chloroformate, isopropyl chloroformate, sec-butyl chloroformate, isobutyl chloroformate, and the like. The following general reaction scheme is illustrative of the formation of the mixed anhydride by this procedure:

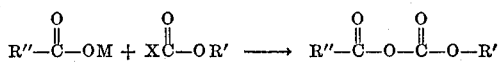

in which R″ in combination with the carbonyl function represents the desired acyl moiety at the 7-amino of the cephalosporin, R′ is a $C_1$–$C_4$ alkyl group, M is a metal and X is halogen.

The acyl substituent in the 7-amino position of the ultimate active cephalosporin antibiotic preferably is furylacetyl, thienylacetyl, benzoyl, ring substituted benzoyl, phenoxyacetyl, ring substituted phenoxyacetyl, phenylacetyl, ring substituted phenylacetyl, α-aminophenylacetyl, ring substituted α-aminophenylacetyl, α-hydroxyphenylacetyl or ring substituted α-hydroxyphenylacetyl.

In the case of substituents on the phenyl ring, it is preferred that these be located at the 3- or 4-position. Such substituents include trifluoromethyl, loweralkyl, loweralkoxy, hydroxy, nitro, amino, loweralkylamino, diloweralkylamino, or halo, including chloro, bromo, or fluoro. The term "lower" when used herein with reference to an alkyl or alkoxy group is intended to mean one having from 1 to 3 carbon atoms. With respect to alkyl groups, therefore, these include methyl, ethyl, propyl and isopropyl whilst alkoxy groups include methoxy, ethoxy, propoxy and isopropoxy.

More preferably, however, the acyl substituent is phenylacetyl, 3- or 4-hydroxyphenylacetyl, phenoxyacetyl, 2-thienylacetyl, α - hydroxyphenylacetyl, α - aminophenylacetyl, α - amino-3-hydroxyphenylacetyl, α-amino-4-hydroxyphenylacetyl, α - hydroxy-3-hydroxyphenylacetyl, or α - hydroxy-4-hydroxyphenylacetyl. In each instance the appropriate mixed anhydride is employed in the acylation. However, in the case of the acylation of the cephalosporin nucleus with a mixed anhydride to produce an antibiotic having a free hydroxyl or amino group in the 7-acyl substituent, for example, a phenylglycyl (α-aminophenylacetyl) substituent, it is essential that, during the acylation reaction, the amino or hydroxyl substituent of the intended acyl substituent be protected with any of the commonly used protecting groups.

In the case of the protected hydroxyl substituent, defined herein as —OY, any of the commonly used protecting groups can be employed, such as $C_1$–$C_4$ alkyl, for example, methyl, ethyl, and tert-butyl; benzyl; substituted benzyl, such as p-alkoxybenzyl; and loweralkanoyl, such as formyl, acetyl and propionyl.

In the case of the protected amino substituent, defined herein as —NHR''', any of the commonly used protecting groups can be employed, such as t-butoxycarbonyl, 2,2,2-trichloroethoxycarbonyl, benzyloxycarbonyl, p-nitrobenzyloxycarbonyl, or an enamine formed by reacting, for example, phenylglycine with an alkyl acetoacetate, such as methyl acetoacetate.

In carrying out the acylation of the p-nitrobenzyl ester of 7-ACA or 7-ADCA, the p-nitrobenzyl ester is reacted with the acylating agent in the activated form of its mixed anhydride. The reaction is equimolar; however, in order to ensure a more complete reaction with respect to the cephalosporin ester, a slight excess, for example, about 10 percent, of the mixed anhydride, is usually employed. The reaction is carried out in an appropriate diluent, and, in accordance with this invention, at a temperature of from about below —15° C. to about —50° C. Any suitable inert diluent can be employed, the sole criterion being that it be one which will remain in the liquid state at the temperature of reaction. Suitable such diluents include, for example, acetonitrile, propionitrile, toluene, cumene, tetrahydrofuran, and the like.

Although increased yields of acylated product are available by lowering the temperature of reaction to within the range of from about below —15° C. to about —50° C., it is preferred that the reaction be carried out at a temperature within the range of from about —25° C. to about —45° C., and more preferably at a temperature of from about —35° C. to about —40° C.

Upon completion of the acylation reaction, all that remains to obtain the active cephalosporin antibiotic is the removal of the p-nitrobenzyl carboxyl blocking group and any other blocking groups if such are present.

A highly preferred feature of this invention involves the production of the cephalosporin antibiotic known commonly as Cephalexin. Cephalexin has the formula

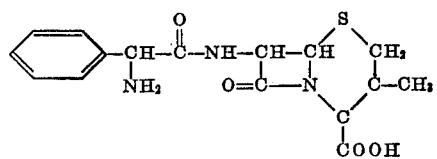

In preparing Cephalexin, the p-nitrobenzyl ester of 7-ADCA is reacted with the mixed anhydride of D-α-phenylglycine suitably blocked at its amino position with an appropriate amino protecting group. This acylation is carried out in accordance with the conditions defined hereinbefore with respect to this invention. Upon completion of the acylation, Cephalexin is produced from the product thereby obtained by removal of the amine and carboxyl blocking groups.

The procedure which is used to remove the amine blocking group will depend upon the blocking group which has been employed. Removal of amine blocking groups is a common procedure well recognized by those skilled in the art. It can be accomplished by acid hydrolysis or hydrogenolysis, and the choice will be influenced by the blocking group which is present in the molecule.

The removal of the p-nitrobenzyl group is readily accomplished by reduction in an acidic medium. Such treatment will simultaneously remove certain amine blocking groups, such as an enamine group, and in those instances will therefore serve to remove both the amine and carboxyl blocking groups. This reduction may be accomplished chemically, such as by the use of zinc and hydrochloric acid or by catalytic hydrogenation using catalysts such as palladium, platinum, or the oxides thereof.

The improved process of this invention will be illustrated further by the following example which demonstrates the preparation of active cephalosporin antibiotics.

EXAMPLE

About 11.92 g. (44 millimoles) of sodium N-(2-methoxycarbonyl - 1 - methylvinyl)-D-α-phenylglycine (prepared from the sodium salt of D-α-phenylglycine and methyl acetoacetate) was added rapidly to a solution of 3.60 ml. (46 millimoles) of methyl chloroformate in 224 ml. of acetonitrile containing 0.13 ml. of N,N-dimethylbenzylamine at —25° C. The mixture was stirred for 20–30 minutes.

About 21.58 g. (40 millimoles) of the tosylate amine salt of the p-nitrobenzyl ester of 7-aminodesacetoxycephalosporanic acid was then added rapidly to the mixture at —25° C. A solution of 5.52 ml. (40 millimoles) of triethylamine dissolved in 65 ml. of acetonitrile was added to the mixture over a period of 12–15 minutes. Stirring was continued and the mixture was warmed gradually to +10° C. over a period of about 1–1.5 hours and stirring was continued at +10° C. for an additional 0.5 hour.

The active cephalosporin antibiotic was produced by adding to the reaction mixture 384 ml. of water and about 3.8 ml. of hydrochloric acid sufficient to lower the pH to 1.5. The solution was held at 0–5° C. and about 7.0 g. of zinc was added portionwise over about 45 minutes along with an additional 18.5 ml. of hydrochloric acid sufficient to maintain the pH at about 2.3. The pH was then reduced to about 1.4 with an additional 2.1 ml. of hydrochloric acid and stirring continued at 0° C. for ten minutes. Excess zinc was removed by filtration, the filtrate stirred at 50° C. for about 70 minutes, cooled, and stored overnight at about 5° C. Yellow polymer formed which was filtered off. The filtrate was acidified by addition of 15.6 ml. of hydrochloric acid, and then the pH raised to 4.7 by addition of triethylamine at which time Cephalexin precipitated. Stirring was continued for two hours at room temperature, the suspension cooled to 5° C., filtered, and washed with a mixture of acetonitrile and water. Cephalexin, in an amount of 10.62 g., representing a yield of 76.5 percent, was recovered.

The table following demonstrates the improvement available by operating in accordance with the present invention. The procedure described in the above example was repeated in several runs, the only difference in the runs being the temperature at which the reaction was carried out. As the following table indicates, a substantial improvement in yield of product was obtained by reducing the temperature of reaction to below the customary $-10$ to $-15°$ C.

TABLE.—ACYLATION OF CEPHALOSPORINS

| Temperature of acylation (° C.) | Product (g.) | Percent yield |
|---|---|---|
| −10 to −15 | 9.58 | 69.0 |
| −10 to −15 | 9.55 | 68.8 |
| −25 | 10.62 | 76.5 |
| −25 | 10.58 | 76.2 |
| −44 | 10.70 | 77.1 |

From the foregoing it is evident that yields of active cephalosporin antibiotics can be substantially improved by carrying out the acrylation of the cephalosporin nucleus at temperatures below the customarily employed $-10°$ to $-15°$ C.

I claim:

1. In the method for the acylation of the p-nitrobenzyl ester of 7-aminocephalosporanic acid (7-ACA) or 7-aminodesacetoxycephalosporanic acid (7-ADCA) with a nitrogen-blocked mixed anhydride of D-α-phenylglycine of the formula

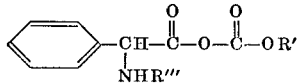

wherein R′ is a $C_1$–$C_4$ alkyl, and R‴ is

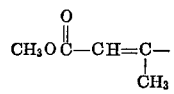

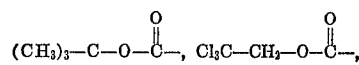

the improvement which comprises conducting the acylation at a temperature of from about $-25°$ C. to about $-45°$ C.

2. The method of claim 1, wherein R‴ is

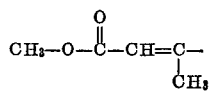

References Cited
UNITED STATES PATENTS
3,632,850  1/1972  Garbrecht _____ 260—243 C NICHOLAS S. RIZZO, Primary Examiner U.S. Cl. X.R.
424—246

PO-1050
(5/69)

UNITED STATES PATENT OFFICE
CERTIFICATE OF CORRECTION

Patent No. 3,769,280     Dated October 30, 1973

Inventor(s)  George Parker

It is certified that error appears in the above-identified patent and that said Letters Patent are hereby corrected as shown below:

Column 2, line 22, after "$(CH_3)_3-C-O-\underset{\underset{O}{\|}}{C}-$," insert -- $Cl_3C-CH_2-O-\underset{\underset{O}{\|}}{C}-$, --.

Signed and sealed this 22nd day of October 1974.

(SEAL)
Attest:

McCOY M. GIBSON JR.
Attesting Officer

C. MARSHALL DANN
Commissioner of Patents